US012573182B2

(12) United States Patent
Ebstyne et al.

(10) Patent No.: US 12,573,182 B2
(45) **Date of Patent: *Mar. 10, 2026**

(54) COMPUTER VISION AND SPEECH ALGORITHM DESIGN SERVICE

(71) Applicant: Microsoft Technology Licensing, LLC, Redmond, WA (US)

(72) Inventors: Michael Ebstyne, Seattle, WA (US); Pedro Urbina Escos, Seattle, WA (US); Yuri Pekelny, Seattle, WA (US); Jonathan Chi Hang Chan, Seattle, WA (US); Emanuel Shalev, Sammamish, WA (US); Alex Kipman, Bellevue, WA (US); Mark Flick, Redmond, WA (US)

(73) Assignee: Microsoft Technology Licensing, LLC., Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/412,440

(22) Filed: Jan. 12, 2024

(65) Prior Publication Data

US 2024/0185579 A1 Jun. 6, 2024

Related U.S. Application Data

(63) Continuation of application No. 17/737,911, filed on May 5, 2022, now Pat. No. 11,928,856, which is a
(Continued)

(51) Int. Cl.
*G06V 10/774* (2022.01)
*G06F 11/3668* (2025.01)
(Continued)

(52) U.S. Cl.
CPC ........ *G06V 10/774* (2022.01); *G06F 11/3684* (2013.01); *G06F 30/20* (2020.01);
(Continued)

(58) Field of Classification Search
CPC ... G06V 10/774; G06F 11/3684; G06F 30/20; G06F 18/214; G06F 2111/18; G06F 18/217; G10L 15/01
See application file for complete search history.

(56) References Cited

U.S. PATENT DOCUMENTS 5,621,858 A * 4/1997 Stork ...................... G10L 15/25
382/156
9,031,782 B1 * 5/2015 Lemay .................... G06T 7/277
701/445
(Continued)

OTHER PUBLICATIONS

Aytar, Y., et al. "SoundNet: Learning Sound Representation from Unlabeled Video" 30th Conf. on Neural Info. Processing Sys., NIPS 2016 (2016) (Year: 2016).*
(Continued)

*Primary Examiner* — Jay Hann
(74) *Attorney, Agent, or Firm* — Barta Jones, PLLC

(57) ABSTRACT

A synthetic world interface may be used to model digital environments, sensors, and motions for the evaluation, development, and improvement of computer vision and speech algorithms. A synthetic data cloud service with a library of sensor primitives, motion generators, and environments with procedural and game-like capabilities, facilitates engineering design for a manufactural solution that has computer vision and speech capabilities. In some embodiments, a sensor platform simulator operates with a motion orchestrator, an environment orchestrator, an experiment generator, and an experiment runner to test various candidate hardware configurations and computer vision and speech algorithms in a virtual environment, advantageously speeding development and reducing cost. Thus, examples disclosed herein may relate to virtual reality (VR) or mixed reality (MR) implementations.

20 Claims, 8 Drawing Sheets

Related U.S. Application Data continuation of application No. 16/138,923, filed on Sep. 21, 2018, now Pat. No. 11,354,459, which is a continuation-in-part of application No. 15/974,665, filed on May 8, 2018, now Pat. No. 11,087,176.

(51) Int. Cl.
| | |
|---|---|
| *G06F 30/20* | (2020.01) |
| *G06F 111/18* | (2020.01) |
| *G10L 15/01* | (2013.01) |
| *G06F 18/214* | (2023.01) |

(52) U.S. Cl.
CPC ............ *G10L 15/01* (2013.01); *G06F 18/214* (2023.01); *G06F 2111/18* (2020.01)

(56) References Cited

U.S. PATENT DOCUMENTS

| | | | | |
|---|---|---|---|---|
| 9,734,419 | B1 * | 8/2017 | Ye | G06T 7/85 |
| 10,224,058 | B2 * | 3/2019 | Variani | G10L 19/008 |
| 10,274,346 | B2 * | 4/2019 | Le Grand | G01D 9/00 |
| 10,437,702 | B2 * | 10/2019 | Kalech | G06F 11/3604 |
| 10,552,665 | B2 * | 2/2020 | Moravec | G06V 20/20 |
| 10,621,973 | B1 * | 4/2020 | McVicker | H04R 1/14 |
| 11,853,894 | B2 * | 12/2023 | Rabinovich | G06N 3/0985 |
| 2004/0015775 | A1 * | 1/2004 | Simske | G06F 16/48 |
| | | | | 715/255 |
| 2014/0288896 | A1 * | 9/2014 | Li | G01C 19/38 |
| | | | | 703/2 |
| 2019/0196940 | A1 * | 6/2019 | Psiaki | G06F 11/3664 |
| 2019/0340317 | A1 * | 11/2019 | Chan | G06F 30/20 |
| 2019/0347369 | A1 | 11/2019 | Ebstyne et al. | |
| 2020/0012756 | A1 * | 1/2020 | Ma | G06F 30/20 |
| 2020/0302241 | A1 * | 9/2020 | White | G06V 10/772 |
| 2023/0114734 | A1 | 4/2023 | Moon | |

OTHER PUBLICATIONS

Yau, W. & Kumar, D. "Visual Speech Recognition and Utterance Segmentation based on Mouth Movement" IEEE Digital Image Computing Techniques & Applications, pp. 7-14 (2007) (Year: 2007).*

Mania, K. "Simulating Perception with Interactive Virtual Environments" IEEE Int'l Conf. on Systems Man & Cybernetics, pp. 2770-2776 (2004) (Year: 2004).*

Vincent, E., et al. "An Analysis of Environment, Microphone and Data Simulation Mismatches in Robust Speech Recognition" Computer Speech & Language, vol. 46, pp. 535-557 (2016) (Year: 2016).*

Gaidon, A. "Virtual Worlds as Proxy for Multi-Object Tracking Analysis" Proceedings of the IEEE Conference on Computer Vision & Pattern Recognition (CVPR), pp. 4340-4349 (2016) (Year: 2016).*

Kotthauser, T. & Mertsching, B. "Validating Vision and Robotic Algorithms for Dynamic Real World Environments" Simulation Modeling & Programming for Autonomous Robots, LNAI 6472, pp. 97-108 (2010) (Year: 2010).*

Communication under Rule 71(3) received in European Application No. 19727542.3, mailed on Aug. 1, 2024, 7 pages.

Communication under Rule 71(3) Received in European Patent Application No. 19727542.3, mailed on Mar. 26, 2024, 8 pages.

EPO Notification Rule 71(3) received in European Application No. 19724984.0, mailed on Jun. 27, 2024, 7 pages.

Decision to grant a European patent pursuant to Article 97(1) received in European Application No. 19724984.0, mailed on Oct. 10, 2024, 2 pages.

Decision to Grant pursuant to Article 97(1) received in European Application No. 19727542.3, mailed on Oct. 31, 2024, 2 pages.

Extended European search report received in European Application No. 24209025.6, mailed on Jan. 30, 2025, 12 pages.

Notice of Allowance mailed on Apr. 20, 2021, in U.S. Appl. No. 15/974,665, 8 pages.

Notice of Allowance mailed on Jul. 2, 2021, in U.S. Appl. No. 15/974,665, 6 pages.

Communication under Rules 70(2) and 70a (2) Received for European Application No. 24209025.6, mailed on Mar. 10, 2025, 2 pages.

Notice of Allowance mailed on Feb. 26, 2025, in U.S. Appl. No. 18/498,024, 10 pages.

* cited by examiner

300

302

COMPUTING DEVICE

PROCESSOR — 304

306

MEMORY AREA — 308

APPLICATIONS / ALGORITHMS — 310

EXECUTABLE INSTRUCTIONS

312

DATA SOURCES

330

332

334

336

314

USER INTERFACE COMPONENT

320

322

324

USER

USER DEVICE

COMMUNICATIONS NETWORK

Figure 4:
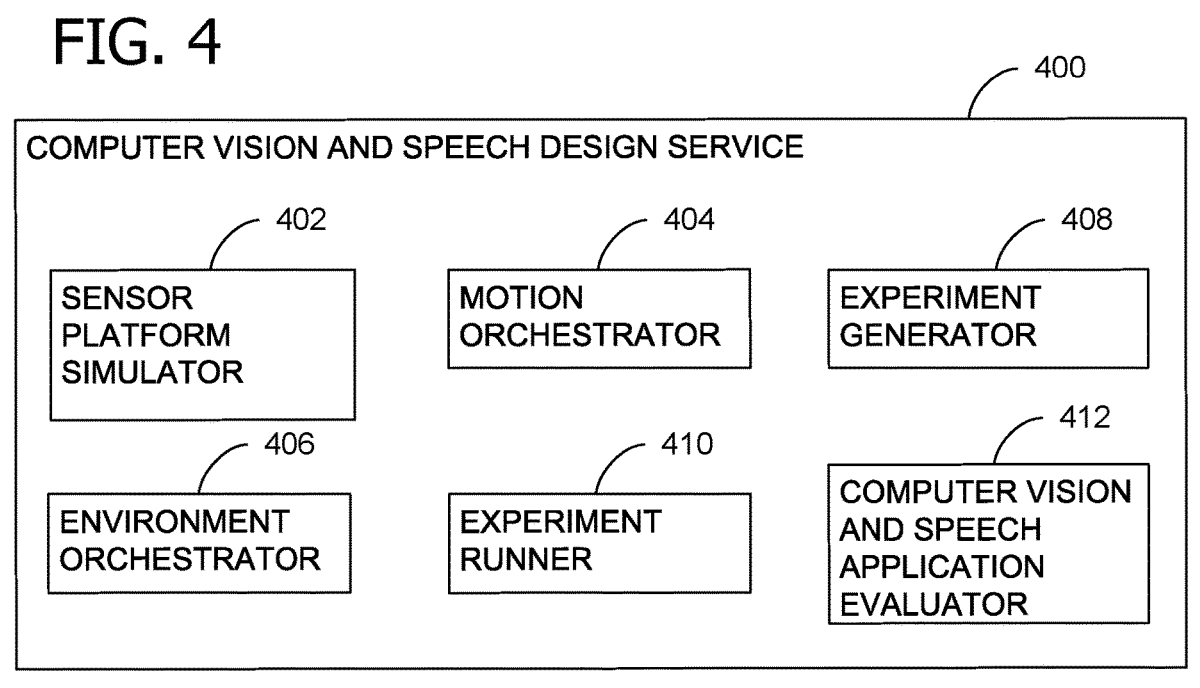

COMPUTER VISION AND SPEECH DESIGN SERVICE

402

SENSOR
PLATFORM
SIMULATOR

404

MOTION
ORCHESTRATOR

408

EXPERIMENT
GENERATOR

406

ENVIRONMENT
ORCHESTRATOR

410

EXPERIMENT
RUNNER

412

COMPUTER VISION
AND SPEECH
APPLICATION
EVALUATOR

COMPUTER VISION AND SPEECH ALGORITHM DESIGN SERVICE

CROSS-REFERENCE TO RELATED APPLICATION

This application is a continuation of U.S. patent application Ser. No. 17/737,911, filed on May 5, 2022, and entitled "COMPUTER VISION AND SPEECH ALGORITHM DESIGN SERVICE," which is a continuation of U.S. patent application Ser. No. 16/138,923 (now U.S. Pat. No. 11,354, 459), filed on Sep. 21, 2018 and entitled "COMPUTER VISION AND SPEECH ALGORITHM DESIGN SERVICE," which is a continuation-in-part of U.S. Pat. No. 11,087,176, filed on May 8, 2018 and entitled "SPATIAL LOCALIZATION DESIGN SERVICE," both of which are incorporated herein by reference in their entireties.

BACKGROUND

Generally speaking, computer vision refers to the ability deals with how computers and electronic devices can be programmed or learn how to recognize objects in space, model their properties, and understand how the objects behave-all from digital images, videos, or synthetics (e.g., virtualizations of the objects). Computer vision tasks include acquiring, processing, and analyzing digital images and videos in order to understand how they interact in space, either real, virtual, or augmented.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to using a synthetic world interface to model digital environments, sensors, and motions for the evaluation and development of computer vision and speech algorithms. Some aspects disclosed herein are directed to determining the plausibility of a particular computer vision and speech algorithm for a consumer scenario (e.g. Virtual Reality (VR)). This may be accomplished by observing the performance of a candidate algorithm on synthetic (virtually generated) scenes that have been generated by a synthetic world interface to model digital environments, sensors, and motions. Furthermore, a computer vision algorithm may require tuning of multiple parameters for proper function in intended usage scenarios. Using a synthetic data cloud service with a library of sensor primitives, motion generators, and environments with procedural and game-like capabilities, may facilitate engineering design for a manufactural solution involving computer vision capabilities.

In some embodiments, a sensor platform simulator operates with a motion orchestrator, an environment orchestrator, an experiment generator, and an experiment runner to test various candidate hardware configurations and computer vision algorithms in a virtual environment, advantageously speeding development and reducing cost. Some aspects disclosed herein are directed to testing various candidate hardware configurations for a given computer vision algorithm. A motion orchestrator, environment orchestrator, and experiment generator may rapidly produce relatively large quantities of data to inform the optimal candidate hardware configuration, thus advantageously speeding development and reducing cost.

Some aspects disclosed herein are directed to a networked environment of servers configured for rapidly generating synthetic testing data or evaluating algorithm performance and hardware configurations. For instance, a sensor platform simulator may be used to simulate hardware configurations comprising the one or more virtual sensors (e.g., sensors and/or microphones). An environment orchestrator may simulate one or more virtual environments. A motion orchestrator may simulate motion of the one or more simulated hardware configurations within the one or more virtual environments. An experiment generator may generate synthetic experiment data for the one or more simulated hardware configurations having the simulated motion within the one or more virtual environments. And an experiment runner for iterating the experiment generator to generate the synthetic experiment data for one or more combinations of hardware configurations, virtual environment, motion and computer vision speech algorithms.

Alternatively or in addition to the other examples described herein, some examples include any combination of the following: the experiment generator further calculates computer vision and speech data for the one or more hardware configurations from the synthetic experiment data: the servers, method, or instructions further comprise an evaluator for comparing the calculated computer vision data with ground truth data: the synthetic experiment data comprises synthetic images: the synthetic experiment data comprises IMU data: the IMU data comprises accelerometer data: the IMU data comprises gyroscope data.

BRIEF DESCRIPTION OF THE DRAWINGS

The disclosed examples are described in detail below with reference to the accompanying drawing figures listed below:

FIG. 4 is a block diagram of a computer vision and speech design service suitable for implementing some of the various examples disclosed herein:

Corresponding reference characters indicate corresponding parts throughout the drawings.

DETAILED DESCRIPTION

Figure 1:
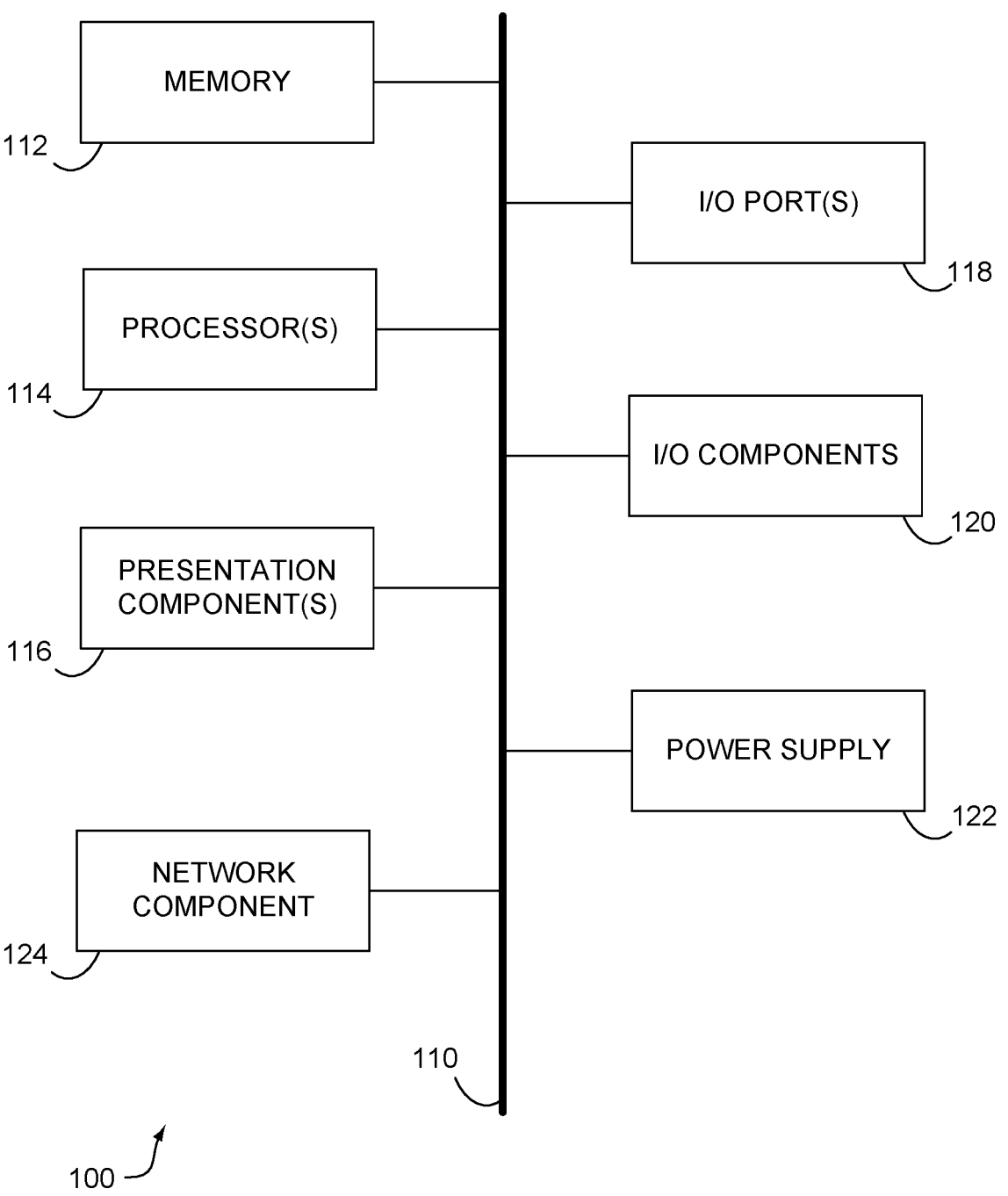
FIG. 1 is a block diagram of an example computing environment suitable for implementing some of the various examples disclosed herein.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

In general, designing solutions that inform both the hardware and algorithmic requirements for a new computer vision and speech platform are extremely difficult. The efforts involve factors of environment, motion and physics, and sensors. Developing computer vision and speech algorithms typically requires exploration and analysis across a wide range of use cases that ultimately utilize a combination of sensors, processors, and algorithms. The wide range of sensor configurations, environmental conditions, and motion conditions that must often be investigated (within the range of solutions to be explored) to verify that an algorithm and device will reliably perform as intended, can introduce significant cost and scheduling issues. It may also require substantial and specific intelligence by the developers of the various hardware and algorithms being used.

Setting up an experimentation workflow for a manual build-test-repeat type process typically requires dependence on manually collecting and labelling large amounts of data that must be collected by sending testers with prototype devices into real-world environments to collect sensor data streams. As data is gathered on an ad-hoc and exploratory basis, the data is ingested into computer networks that may use some form of a pipeline for analyzing data quality and experimental results. Ensuring that the proper amount and format of data is available and properly cataloged for analysis by the engineers and researchers may be challenging. For example, computer vision (CV) experts may find that the available test data had been collected using off-the-shelf sensors that do not properly represent the planned target device. Therefore, designing solutions that can match well-performing algorithms with cost-effective hardware configurations may be slow and expensive.

Some aspects disclosed herein are directed to using a synthetic world interface to model digital environments, sensors, and motions for the evaluation and development of computer vision and speech algorithms. Systems, methods, and programmed computer memory devices are disclosed herein for a synthetic world interface to model digital environments, sensors, and motions that may, in turn, be supplied as input to computer vision and speech functions for hardware in the form of a collection of real or virtual images. Using a synthetic data cloud service with a library of sensor primitives, motion generators, and environments with procedural and game-like capabilities, may facilitate engineering design for a manufactural solution involving computer vision and speech capabilities. In some embodiments, a sensor platform simulator operates with a motion orchestrator, an environment orchestrator, an experiment generator, and an experiment runner to test various candidate hardware configurations and computer vision and/or speech algorithms in a virtual environment, advantageously speeding development while at the same time reducing cost and development complexity. Thus, examples disclosed herein may relate to virtual reality (VR) or mixed reality (MR) implementations.

A service (referenced below as the "computer vision and speech design service") generates synthetic image(s) for camera sensors, audio recordings for microphone sensors, and inertial sensor data for inertial measurement unit (IMU) sensors corresponding to a modeled environment, to permit iterative testing that can be leveraged to improve the functionality of the virtual sensor in a synthetically (or artificially) generated scene. Computer vision and speech recognition are performed in a synthetic video scene, modeling various configurations of hardware; including particular lenses: sensors: and IMUs that can include accelerometers, gyroscopes, and magnetometers. Computer vision and speech parameters that include coordinates of a virtual sensor in a synthetic environment may be algorithmically determined based on the hardware configuration, specified movement (if any), and other objects specified in a synthetic scene. For example, a user may specify that a synthetic scene has a virtual sensor with a particular type of camera lens and other sensors (e.g., microphone, IMU with a gyroscope, accelerometer, etc.). The architectures and work flows disclosed herein may then compute the computer vision and speech parameters (e.g., x-, y-, and z-direction coordinates) of the virtual sensor in the synthetic environment that had virtually captured synthetic imagery in the simulation, and may also move that sensor, if required. Users can test how well the specified architecture (hardware and algorithms) performed computer vision and speech functions of the virtual sensor (e.g., specified camera lens, microphone, and/or other sensors) by measuring the resultant computer vision and speech performance relative to ground truth (GT) input data.

The desired scenario is that, if the virtual sensor had not moved, but yet some object within a scene had moved (for example a chair), then the computer vision and speech solution should calculate the sensor's position to indicate the lack of movement. The best localization algorithm or service may be evaluated out of a multitude of localization algorithms and services using the techniques disclosed in the '665 patent application, which again is incorporated by reference in its entirety.

In some embodiments, the computer vision and speech design service iteratively evaluates—either alone or in combination—localization services, recognition services, object tracking services, object reconstructions services, or speech recognition services using artificial intelligence in order to determine the best-functioning services to use in computer vision models. As referenced herein, "computer vision" refers to any combination of services related to localization, object recognition, object tracking, and object reconstruction; and "speech" services refer to any audio or speech recognition services. Collectively, "computer vision and speech" services refer to the combination of the two: computer vision services and speech services.

For instance, the computer vision and speech design service may evaluate and select the best localization services out of a multitude of localization algorithms and services using the techniques disclosed in the '665 patent application, which again is incorporated by reference in its entirety. Alternatively or additionally, the computer vision and speech design service may evaluate a multitude of other services besides localization services using artificial intelligence or machine learning, including, for example but without limitation services for: recognizing objects (object recognition services), tracking objects as they move movement (object tracking services), reconstructing physical and internal properties of objects (object reconstruction services), and/or recognizing speech or other audio (collectively "speech recognition services"). For the sake of clarity, these services (object recognition services, object tracking services, object reconstruction services, or speech recognition services, or the like) are referred to herein as "computer vision and speech design services."

In operation, the computer vision and speech design service iteratively evaluates-either alone or in combination-localization services, recognition services, object tracking services, object reconstructions services, or speech recognition services using artificial intelligence in order to determine the best-functioning services to use in computer vision models. For example, the computer vision and speech design service may evaluate 1000 different algorithms performing object tracking and determine the top object tracking algorithm therefrom using the disclosed synthetic architecture described below. Any of the other services may likewise be evaluated as well.

To further clarify, "computer vision" refers herein to computerized tasks focused on acquiring, processing, analyzing and understanding actual or synthetic digital images, with the ultimate goal being to use computers to emulate human vision, including autonomously analyzing, learning, inferring, and taking actions based on the actual or synthetic images. As referenced in more detail below, computer vision includes, without limitation, object recognition, object tracking, object reconstruction, object reconstruction, and/or speech recognition.

Speech recognition, as referenced herein, refers to the use of computers for the identification, analysis, and understanding of speech in actual and synthetic video (e.g., a sequence of digital images). The synthetic environments discussed below model sensors (e.g., microphones) for capturing speech data in actual or synthetic environments. The captured speech data may be analyzed myriad speech-recognition software using AI, machine learning, or a combination thereof, to identify optimal speech-recognition software and microphone sensors to use in given scenes. It should be noted, however, that speech recognition mentioned herein refers to audio sensors and speech identification, recognition, and analysis in the broader context of computer vision within a synthetic environment.

For additional clarity, some examples and embodiments disclosed herein specifically refer to localization services and algorithms- and the evaluation thereof—but the disclosed computer vision and speech design service may evaluate any of the aforementioned computer vision and speech design services (e.g., object recognition services, object tracking services, object reconstruction services, or speech recognition services, or the like) in the same ways disclosed herein.

A computer vision and speech design service may thus be evaluated or tuned, based upon the accuracy of its determination. The processing of the synthetic imagery may be affected by factors such a lens quality, light sensor resolution, and the dynamic range in lighting levels to which the light sensor responds within acceptable parameters. Poor imagery quality may negatively computer vision and speech recognition accuracy or precision. So, an example experiment may include testing a first hardware configuration, with a first lens and light sensor, generate a synthetic scene, generate synthetic imagery with a digital model of the first hardware configuration, use that synthetic imagery to solve a computer vision and speech design service problem, compare the calculated position with the known simulated position, and repeat for environmental changes. Such processing may be repeated or concurrently performed for a second hardware configuration. Designers may then use the results to ascertain which hardware configuration may be preferable for solving the computer vision and speech design service calculations, such as whether a particular hardware configuration is required or optional, has better resolution, or a different light sensor dynamic range. In some situations, it may be determined by the designers that an additional sensor is needed, or perhaps stereo imagery processing.

In some embodiments, a synthetic video scene, which is a virtual rendering of a scene, may not be based on imagery of an actual physical set-up, but may instead be created using three-dimensional (3D) rendering techniques. Applicable 3D rendering techniques may include a content repository (for virtual objects), a device and sensor model library, a procedural environment, scene interaction controls, a lighting model, a physics simulation, and animating motions. A synthetic video may be generated by defining one or more virtual sensor platforms that consists of various sensor(s), inertial measuring unit(s) (IMUs), lenses, processors, etc.; specifying the movement of the sensor: specifying the objects in the room; and integrating with various algorithms (physics, scene interactions, animation, etc.). Additionally, a defined synthetic scene present virtualized objects that are viewed by synthetic sensors undergoing virtual movement to create a set of imagery that may be mined for data useable not only for localization, but for definition of a derived synthetic scene. Just as a real-world camera may be moved around a room by users, capturing video of a room to generate data for a synthesized version of that room, a synthetic camera placed virtually into a synthetic scene can generate an equivalent data set. Thus, a cost-effective end-to-end computer vision and speech design service is disclosed that may be leveraged for rapidly optimizing both localization, object recognition, object tracking, object reconstruction, and/or speech recognition algorithms and hardware configurations. For example, in comparison with a manual build-and-test process, a synthetic design solution may reduce development timelines from months to days, and potentially cut some development costs by orders of magnitude.

FIG. 1 is a block diagram of an example computing device 100 for implementing aspects disclosed herein, and is designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components/modules illustrated.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments, such as those disclosed in FIG. 2 described in more detail below, where tasks are performed by remote-processing devices that are linked through a communications network.

Computing device 100 includes a bus 110 that directly or indirectly couples the following devices: computer-storage memory 112, one or more processors 114, one or more presentation components 116, input/output (I/O) ports 118, I/O components 120, a power supply 122, and a network component 124. Computer device 100 should not be interpreted as having any dependency or requirement related to any single component or combination of components illustrated therein. While computer device 100 is depicted as a seemingly single device, multiple computing devices 100 may work together and share the depicted device resources. For instance, computer-storage memory 112 may be distributed across multiple devices, processor(s) 114 may provide housed on different devices, and so on.

Bus 110 represents what may be one or more busses (such as an address bus, data bus, or a combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and the references herein to a "computing device."

Computer-storage memory 112 may take the form of the computer-storage media references below and operatively provide storage of computer-readable instructions, data structures, program modules and other data for the computing device 100. For example, computer-storage memory 112 may store an operating system, a universal application platform, or other program modules and program data. Computer-storage memory 112 may be used to store and access instructions configured to carry out the various operations disclosed herein.

As mentioned below, computer-storage memory 112 may include computer-storage media in the form of volatile and/or nonvolatile memory, removable or non-removable memory, data disks in virtual environments, or a combination thereof. And computer-storage memory 112 may include any quantity of memory associated with or accessible by the display device 100. The memory 112 may be internal to the display device 100 (as shown in FIG. 1), external to the display device 100 (not shown), or both (not shown). Examples of memory 112 in include, without limitation, random access memory (RAM); read only memory (ROM): electronically erasable programmable read only memory (EEPROM): flash memory or other memory technologies: CDROM, digital versatile disks (DVDs) or other optical or holographic media: magnetic cassettes, magnetic tape, magnetic disk storage or other magnetic storage devices; memory wired into an analog computing device: or any other medium for encoding desired information and for access by the display device 100. Additionally or alternatively, the computer-storage memory 112 may be distributed across multiple display devices 100, e.g., in a virtualized environment in which instruction processing is carried out on multiple devices 100. For the purposes of this disclosure, "computer storage media," "computer-storage memory," "memory," and "memory devices" are synonymous terms for the computer-storage media 112, and none of these terms include carrier waves or propagating signaling.

Processor(s) 114 may include any quantity of processing units that read data from various entities, such as memory 112 or I/O components 120. Specifically, processor(s) 114 are programmed to execute computer-executable instructions for implementing aspects of the disclosure. The instructions may be performed by the processor, by multiple processors within the computing device 100, or by a processor external to the client computing device 100. In some examples, the processor(s) 114 are programmed to execute instructions such as those illustrated in the flowcharts discussed below and depicted in the accompanying drawings. Moreover, in some examples, the processor(s) 114 represent an implementation of analog techniques to perform the operations described herein. For example, the operations may be performed by an analog client computing device 100 and/or a digital client computing device 100.

Presentation component(s) 116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 100, across a wired connection, or in other ways.

Ports 118 allow computing device 100 to be logically coupled to other devices including I/O components 120, some of which may be built in. Examples I/O components 120 include, for example but without limitation, a microphone, joystick, game pad, satellite dish, scanner, printer, wireless device, etc.

Figure 2:
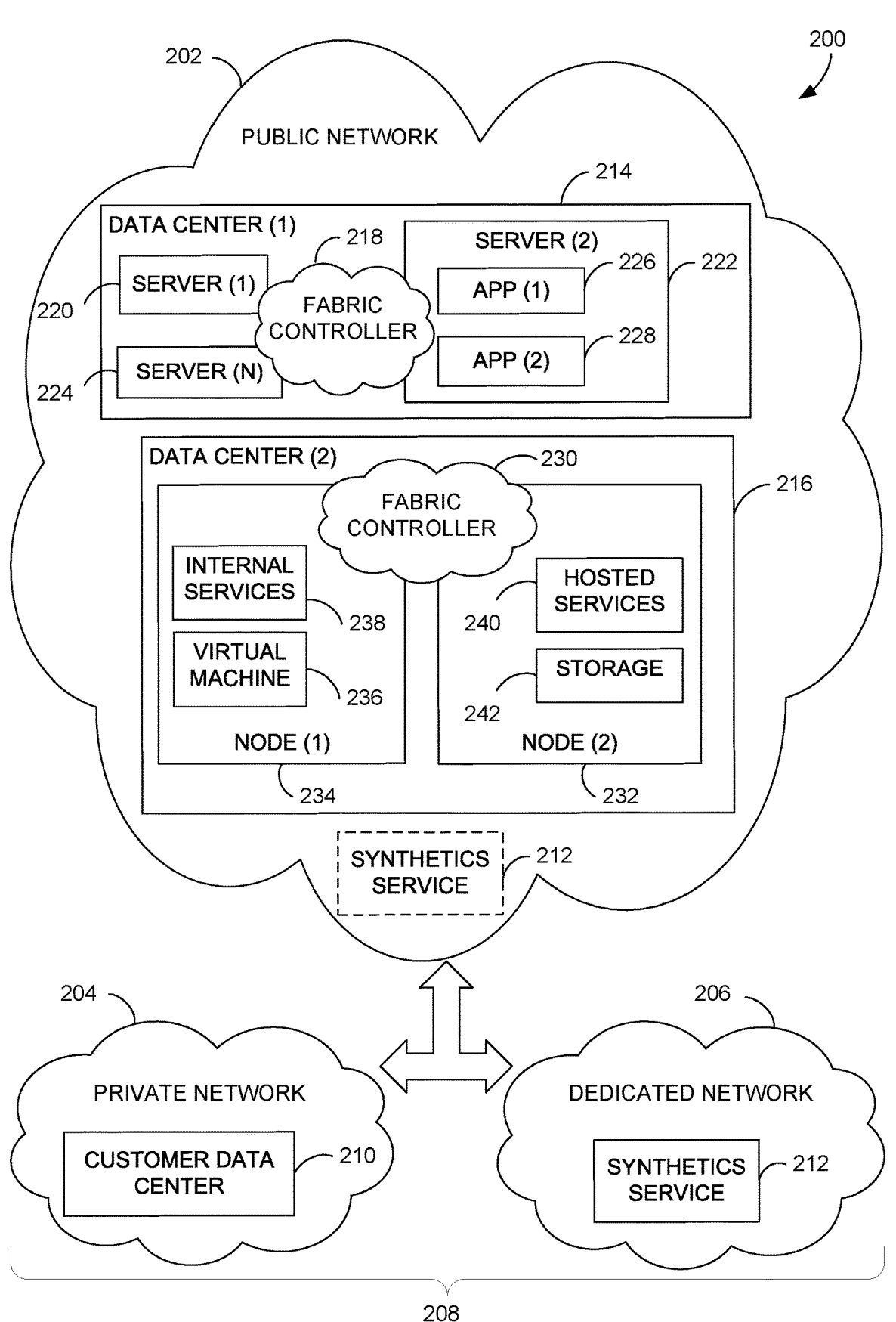
FIG. 2 is a block diagram of an example cloud-computing infrastructure suitable for a synthetics service implementing some of the various examples disclosed herein.
Figure 5:
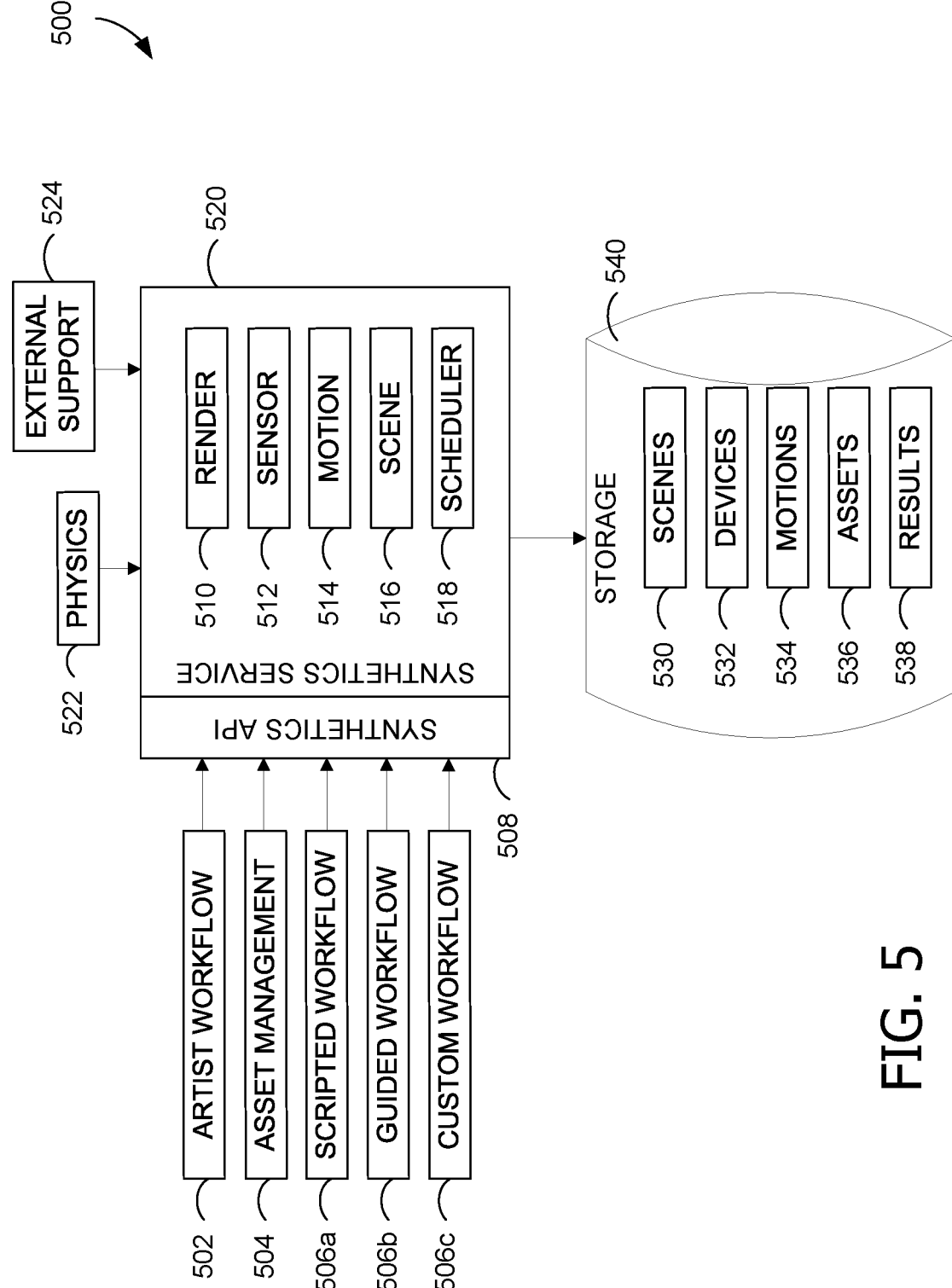
FIG. 5 is an illustration of an architecture for creating synthetic imagery, according to some of the various examples disclosed herein.

The computing device 100 may operate in a networked environment via the network component 124 using logical connections to one or more remote computers, such as those shown in FIGS. 2 and 5. In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, the network component 124 is operable to communicate data over public, private, or hybrid (public and private) using a transfer protocol, between devices wirelessly using short range communication technologies (e.g., near-field communication (NFC), BLUETOOTH branded communications, or the like), or a combination thereof.

Turning now to FIG. 2, an exemplary block diagram illustrates a cloud-computing environment for an end-to-end computer vision and speech design service. Cloud environment 200 illustrates an exemplary cloud-computing infrastructure, suitable for use in implementing aspects of this disclosure. Cloud environment 200 should not be interpreted as having any dependency or requirement related to any single component or combination of components illustrated therein. In addition, any number of nodes, virtual machines, data centers, role instances, or combinations thereof may be employed to achieve the desired functionality within the scope of embodiments of the present disclosure.

The distributed computing environment of FIG. 2 includes a public network 202, a private network 204, and a dedicated network 206. Public network 202 may be a public cloud-based network of computing resources, for example. Private network 204 may be a private enterprise network or private cloud-based network of computing resources. And dedicated network 206 may be a third-party network or dedicated cloud-based network of computing resources. In some examples, private network 204 may host a customer data center 210, and dedicated network 206 may host cloud synthetics services 212, which are discussed in more detail below relative to FIG. 4.

Hybrid cloud 208 may include any combination of public network 202, private network 204, and dedicated network 206. For example, dedicated network 206 may be optional, with hybrid cloud 208 comprised of public network 202 and private network 204. Along these lines, some customers may opt to only host a portion of their customer data center 210 in the public network 202 and/or dedicated network 206, retaining some of the customers' data or hosting of customer services in the private network 204. For example, a customer that manages healthcare data or stock brokerage accounts may elect or be required to maintain various controls over the dissemination of healthcare or account data stored in its data center or the applications processing such data (e.g., software for reading radiology scans, trading stocks, etc.). Myriad other scenarios exist whereby customers may desire or need to keep certain portions of data centers under the customers' own management. Thus, in some examples, customer data centers may use a hybrid cloud 208 in which some data storage and processing is performed in the public network 202 while other data storage and processing is performed in the dedicated network 206.

Public network 202 may include data centers configured to host and support operations, including tasks of a distributed application, according to the fabric controller 218. It will be understood and appreciated that data center 214 and data center 216 shown in FIG. 2 are merely examples of suitable implementations for accommodating one or more distributed applications, and are not intended to suggest any limitation as to the scope of use or functionality of examples disclosed herein. Neither should data center 214 and data center 216 be interpreted as having any dependency or requirement related to any single resource, combination of resources, combination of servers (e.g., servers 220 and 224) combination of nodes (e.g., nodes 232 and 234), or a set of application programming interfaces (APIs) to access the resources, servers, and/or nodes.

Data center 214 illustrates a data center comprising a plurality of servers, such as servers 220 and 224. A fabric controller 218 is responsible for automatically managing the servers 220 and 224 and distributing tasks and other resources within the data center 214. By way of example, the fabric controller 218 may rely on a service model (e.g., designed by a customer that owns the distributed application) to provide guidance on how, where, and when to configure server 222 and how, where, and when to place application 226 and application 228 thereon. One or more role instances of a distributed application, may be placed on one or more of the servers 220 and 224 of data center 214, where the one or more role instances may represent the portions of software, component programs, or instances of roles that participate in the distributed application. In other examples, one or more of the role instances may represent stored data that are accessible to the distributed application.

Data center 216 illustrates a data center comprising a plurality of nodes, such as node 232 and node 234. One or more virtual machines may run on nodes of data center 216, such as virtual machine 236 of node 234 for example. Although FIG. 2 depicts a single virtual node on a single node of data center 216, any number of virtual nodes may be implemented on any number of nodes of the data center in accordance with illustrative embodiments of the disclosure. Generally, virtual machine 236 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine(s) 236 may include processing capacity, storage locations, and other assets within the data center 216 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 230 is responsible for automatically managing the virtual machines running on the nodes of data center 216 and for placing the role instances and other resources (e.g., software components) within the data center 216. By way of example, the fabric controller 230 may rely on a service model (e.g., designed by a customer that owns the service application) to provide guidance on how, where, and when to configure the virtual machines, such as virtual machine 236, and how, where, and when to place the role instances thereon.

As discussed above, the virtual machines may be dynamically established and configured within one or more nodes of a data center. As illustrated herein, node 232 and node 234 may be any form of computing devices, such as, for example, a personal computer, a desktop computer, a laptop computer, a mobile device, a consumer electronic device, a server, the computing device 100 of FIG. 1, and the like. In one instance, the nodes 232 and 234 host and support the operations of the virtual machine(s) 236, while simultaneously hosting other virtual machines carved out for supporting other tenants of the data center 216, such as internal services 238 and hosted services 240. Often, the role instances may include endpoints of distinct service applications owned by different customers.

Typically, each of the nodes include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role of instances that reside on the nodes may be to support operation of service applications, and thus they may be interconnected via APIs. In one instance, one or more of these interconnections may be established via a network cloud, such as public network 202. The network cloud serves to interconnect resources, such as the role instances, which may be distributed across various physical hosts, such as nodes 232 and 234. In addition, the network cloud facilitates communication over channels connecting the role instances of the service applications running in the data center 216. By way of example, the network cloud may include, without limitation, one or more communication networks, such as local area networks (LANs) and/or wide area networks (WANs). Such communication networks are commonplace in offices, enterprise-wide computer networks, intranets, and the Internet, and therefore need not be discussed at length herein.

Figure 3:
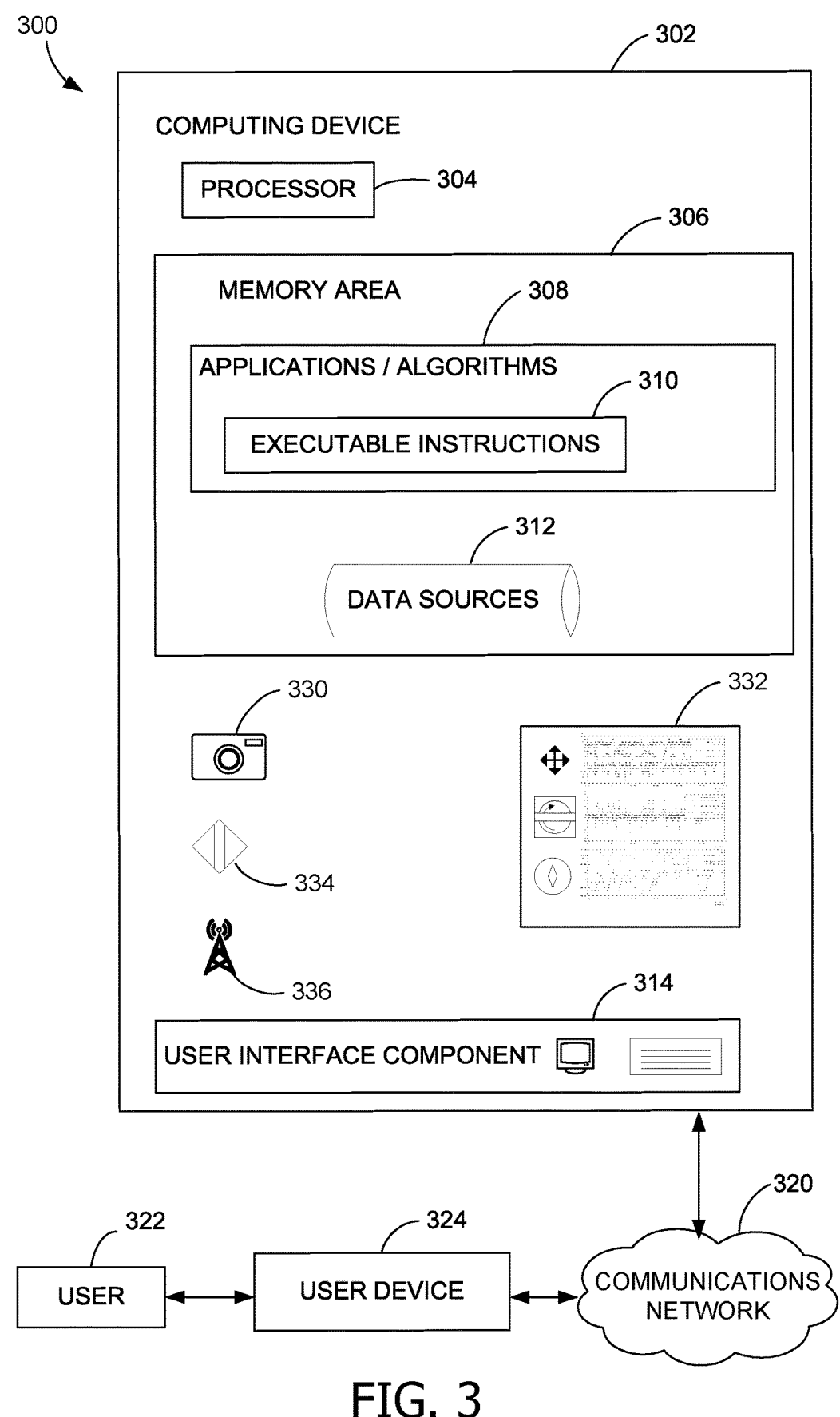
FIG. 3 is a block diagram of an example computing environment that may be implemented as a real-world or synthesized device using some of the various examples disclosed herein.

FIG. 3 is a block diagram of an example computing environment 300 that may be implemented as a real-world device or synthesized using some of the various examples disclosed herein. That is, the computing device 302 may represent a real-world device that is designed using an end-to-end computer vision and speech design service, or may represent a synthetic version used as a test candidate for data generation. Computing device 302 represents any device executing instructions (e.g., as application programs, operating system functionality, or both) to implement the operations and functionality as described herein. Computing device 302 may include a mobile computing device or any other portable device. In some examples, a mobile computing device includes a mobile telephone, laptop, tablet, computing pad, netbook, gaming device, wearable device, head mounted display (HMD) and/or portable media player. Computing device 302 may also represent less portable devices such as desktop personal computers, kiosks, tabletop devices, industrial control devices, wireless charging stations, electric automobile charging stations, and other physical objects embedded with computing resources and/or network connectivity capabilities. Additionally, computing device 302 may represent a group of processing units or other computing devices.

In some examples, computing device 302 has at least one processor 304, a memory area 306, and at least one user interface. These may be the same or similar to processor(s) 114 and memory 112 of FIG. 1, respectively. Processor 304 includes any quantity of processing units, and is programmed to execute computer-executable instructions for implementing aspects of the disclosure. The instructions may be performed by the processor or by multiple processors within the computing device, or performed by a processor external to the computing device. In some examples, processor 304 is programmed to execute instructions such as those that may be illustrated in the others figures.

In some examples, processor 304 represents an implementation of analog techniques to perform the operations described herein. For example, the operations may be performed by an analog computing device and/or a digital computing device.

Computing device 302 further has one or more computer readable media such as the memory area 306. Memory area 306 includes any quantity of media associated with or accessible by the computing device. Memory area 306 may be internal to computing device 302 (as shown in FIG. 3), external to the computing device (not shown), or both (not shown). In some examples, memory area 306 includes read-only memory and/or memory wired into an analog computing device.

Memory area 308 stores, among other data, one or more applications or algorithms 308 that include both data and executable instructions 310. The applications, when executed by the processor, operate to perform functionality on the computing device. Exemplary applications include computer vision and speech applications having computer vision and speech algorithms for identifying the coordinates of computing device 302. The applications may communicate with counterpart applications or services such as web services accessible via a network, such as communications network 320. For example, the applications may represent downloaded client-side applications that correspond to server-side services executing in a cloud. In some examples, applications generated may be configured to communicate with data sources and other computing resources in a cloud during runtime, or may share and/or aggregate data between client-side services and cloud services. Memory area 306 may store data sources 312, which may represent data stored locally at memory area 306, data access points stored locally at memory area 306 and associated with data stored remote from computing device 302, or any combination of local and remote data.

The user interface component 314, may include instructions executed by processor 304 of computing device 302, and cause the processor 304 to perform operations, including to receive user selections during user interaction with universal application platform 308, for example. Portions of user interface component 314 may thus reside within memory area 306. In some examples, user interface component 314 includes a graphics card for displaying data to a user 322 and receiving data from user 322. User interface component 314 may also include computer-executable instructions (e.g., a driver) for operating the graphics card. Further, user interface component 214 may include a display (e.g., a touch screen display or natural user interface) and/or computer-executable instructions (e.g., a driver) for operating the display. In some examples the display may be a 3D display, such as may be found in an HMD. User interface component 214 may also include one or more of the following to provide data to the user or receive data from the user: a keyboard (physical or touchscreen display), speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way. In another example, the user may input commands or manipulate data by providing a gesture detectable by the user interface component, such as a touch or tap of a touch screen display or natural user interface. In still other examples, a user, such as user 322, may interact with a separate user device 324, which may control or be controlled by computing device 302 over communications network 320, a wireless connection, or a wired connection.

As illustrated, computing device 302 further includes a camera 330 (though other types of sensors may be used), which may represent a single camera, a stereo camera set, a set of differently-facing cameras, or another configuration. Computing device 302 may also further include an IMU 332 that may incorporate one or more of an accelerometer, a gyroscope, and/or a magnetometer. The accelerometer gyroscope, and/or a magnetometer may each output measurements in 3D. The combination of 3D position and 3D rotation may be referred to as six degrees-of-freedom (6DoF), and a combination of 3D accelerometer and 3D gyroscope data may permit 6DoF measurements. In general, linear accelerometer data may be the most accurate of the data from a typical IMU, whereas magnetometer data may be the least accurate.

Also illustrated, computing device 302 additionally includes a generic sensor 334 and a transceiver 336. In some embodiments, transceiver 336 is an antenna capable of transmitting and receiving radio frequency ("RF") or other wireless signals over the network 106. One skilled in the art will appreciate and understand that various antennae and corresponding chipsets may be used to provide communicative capabilities between the display device 100 and other remote devices. Examples are not limited to RF signaling, however, as various other communication modalities may alternatively be used. The computing device 100 may communicate over a network. Examples of computer networks 106 include, without limitation, a wireless network, landline, cable line, fiber-optic line, local area network (LAN), wide area network (WAN), or the like, and such networks may comprise subsystems that transfer data between servers or computing devices 100. For example, the network 150 may also include a point-to-point connection, the Internet, an Ethernet, a backplane bus, an electrical bus, a neural network, or other internal system.

Generic sensor 334 may include an infrared (IR) sensor, a light detection and ranging (LIDAR) sensor, an RGB-D sensor, an ultrasonic sensor, or any other sensor, including sensors associated with position-finding and range-finding. Transceiver 336 may include BLUETOOTH, Wi-Fi, cellular, or any other radio or wireless system. Transceiver 336 may act as a sensor by detecting signal strength, direction-of-arrival and location-related identification data in received signals. Together, one or more of camera 330, IMU 332, generic sensor 334, and transceiver 336 may collect data (either real-world, or synthetics may virtually collect) for use in computer vision and speech algorithms.

FIG. 4 is a block diagram of a computer vision and speech design service 400 that is suitable for implementing some of the various examples disclosed herein. Computer vision and speech design service 400 includes a sensor platform simulator 402 that may implement a synthetics service for improving computer vision through simulated hardware optimization. Sensor platform simulator 402 may include a pipeline for simulating performance of sensor platforms (such as a synthetic version of computing device 302 of FIG. 3). Sensor platform simulator 402 may be used for simulating one or more hardware configurations comprising one or more virtual sensors.

Computer vision and speech design service 400 additionally operates four other illustrated modules, although it should be understood that various functionality described as being included within one module may actually be spread among multiple modules. The illustrated modules include a motion orchestrator 404, an environment orchestrator 406, and experiment generator 408, an experiment runner 410, and a computer vision and speech application evaluator 412.

In some embodiments, motion orchestrator module 404 permits users of computer vision and speech design service 400 to model motion that is relevant for testing computer vision and speech sensor platforms and algorithms by expressing targeted motion profiles. Motion orchestrator 404 may be used for simulating motion of the one or more simulated hardware configurations within one or more virtual environments. Examples may include creating instances of multiple random walks through a virtual scene or room, having various durations, speeds, and motion pathways.

Environment orchestrator 406 is used for simulating one or more virtual environments. In some embodiments, environment orchestrator 406 permits users to manipulate synthetic environments, such as light settings and the state of certain objects, such as doors. Additionally or alternatively, environment orchestrator 406 defines the dimensions, objects, lighting, spacing, or other attributes of a room in scene and the contents therein.

Experiment generator 408 converts high level parameters into multiple instances of complete experiments, which define sets of motions and environments to be used in data generation. Experiment generator 408 may be used for generating synthetic experiment data for the one or more simulated hardware configurations having the simulated motion within the one or more virtual environments. That is, experiment generator 408 generates a plurality of candidate computer vision and speech solutions having differing hardware configurations to be tested or computer vision and speech algorithm parameters that may be tuned. In some embodiments, experiment runner 410 provides a framework for scheduling, monitoring, managing, and reviewing results of batches of experiments used in data generation.

Experiment runner 410 may be used for iterating the experiment generator to generate the synthetic experiment data for one or more combinations of hardware configurations, virtual environment, and motion. This iterative processing may be done using different computer vision and speech algorithms accessible to the computer vision and speech design service 400 via the cloud environment 200. For example, the virtual hardware configurations in the synthetic environment may be independently processed with 50, 100, or 1000 different computer vision and speech algorithms to test how well those algorithms model the computer vision and speech given the hardware configuration. In this vein, experiment generator calculates computer vision and speech data for the one or more hardware configurations in the synthetic experiment—with or without the simulated motion-using the various computer vision and speech algorithms to produce computer vision and speech algorithm output data that indicates computer vision and speech parameters (e.g., coordinates, relative location information, disambiguation, object size, object direction, object acceleration, speech, audio, object assembly, dynamic and properties of object, and the like) for the simulated hardware configuration in the synthetic environment. Such computer vision and speech algorithm output data for the different computer vision and speech algorithms may comprise synthetic images and/or IMU data (which may comprise accelerometer data and/or gyroscope data and/or magnetometer data) for the virtualized hardware being tested.

In some embodiments, computer vision and speech application evaluator 412 computer vision and speech algorithm output data to GT input data for the virtualized hardware configuration (with or without simulated motion) to determine how effectively the various computer vision and speech algorithms are performing. Such determinations of the effectiveness of the various computer vision and speech algorithms may be determined by comparing the variance of the computer vision and speech algorithm output data to GT data for virtual hardware configuration in the synthetic environment, computer vision and speech design algorithms identified as being the closest or within a range of closeness (e.g., within X percent, Y virtual distance, or a combination thereof) to the GT for the virtual hardware configuration may be identified as more accurately computing computer vision and speech parameters and stored accordingly. Other computer vision and speech algorithms may be determined to be less accurate and/or needing additional configuring (e.g., needing more programming or analyzing more images, synthetic scenes, motion, and/or hardware configurations). For these lesser-accurate computer vision and speech applications, disparity data of a simulated virtual hardware configuration compared with its ground truth may be fed back to improve the performance of such computer vision and speech applications. For instance, a computer vision and speech application that produced computer vision and speech algorithm output data comprising computer vision and speech results that exceeded a certain variance threshold (e.g., more than X percentage away from the GT of a simulated hardware configuration) away from the underlying GT may be used by an artificial intelligence (AI) application running in the cloud environment 200 to optimize the deficient computer vision and speech application by running more testing against other synthetic scenes, motions, and hardware configurations until the computer vision and speech application performs within the variance threshold. Such AI processing and machine-learning may use the computer vision and speech results described herein to improve computer vision and speech algorithms without user intervention.

Operation of computer vision and speech design service 400 includes multiple processes that use the various modules illustrated. A user may set up devices, environments, and motion engines using sensor platform simulator 402. These parameters define the target device, scenes and environments, and the types of motions that will be used for the design process. A user may activate motion orchestrator module 404 to design how the motion engine can be manipulated for a particular type of experiment and also activate environment orchestrator module 406 to design how the environment engine can be manipulated for a particular type of experiment. For example, a researcher/engineer may be interested in the re-localization portion of the environment and may thus generate thousands of 5-second tests, all within the same area of a single modeled room, where the internal conditions of the room are varied systematically, such as moving by the furniture or varying lighting conditions.

A user may activate experiment generator module 408 to generate sets of experiments that accrue to a particular aspect of the computer vision and speech design problem. Experiments may fall into a variety of categories, such as general testing, research and development, or stress testing. General testing often aims to generate the minimal required representative dataset for base coverage of the computer vision and speech unit under test. Research and development experiments may be nuanced, attempting target minimal or maximal lighting conditions that the device supports or to discover specific product or algorithm bugs. Stress testing tends to target the broadest set of experiments that the device may encounter, in addition to simulated long running or erratic usage patterns. In general, a user may leverage experiment generator 408 to parameterize the underlying frameworks and generate workloads for fully automated simulation and analysis of computer vision and speech algorithms. The user may then use experiment runner 410 to schedule, kick-off, manage, and monitor the various jobs that were designed with experiment generator 408. An optional evaluator (see FIG. 6) may be used for comparing the calculated computer vision and speech data with ground truth data.

FIG. 5 is an illustration of an architecture 500 for creating synthetic imagery, according to some of the various examples disclosed herein. In architecture 500 several inputs, including an artist workflow 502, an asset management 504, and other workflows (a scripted workflow 506a, a guided workflow 506b, and a custom workflow 506c) interface via a synthetics API 508 to a synthetics service 520. Synthetics service 520 has multiple components or modules, including a renderer 510, a sensor modeler 512, a motion module 514, a scene generation module 516, and a scheduler 518. External functionality is illustrated as a physics service 522 and other external support 524, which may include off-loaded rendering computations. It should be understood that different functionalities may be internal or external services, and that FIG. 5 is only used for illustrative purposes. Together, the various functionality is able to intake virtual objects (assets), lighting models, orchestrated motion, camera and other sensor positions, to render synthetic (virtual) scene imagery.

The generated synthetic imagery, scene data and other associated data may then be archived in a storage medium 540 for use in the described virtual experimentation. As illustrated, various data sets are stored, including the scene data 530, device data 532, motion data 534, asset data 536, and results 538. The scene data 530, device data 532, motion data 534, asset data 536, and results 538 enable the evaluation of the quality of a computer vision and speech algorithm and its associated parameters when provided to the evaluator 636 (described in relation to FIG. 6). Furthermore, the stored results can inform experiment generator 408 (of FIG. 4) as to which experiment to run next to further analyze the quality of one or more computer vision and speech algorithms.

Figure 6:
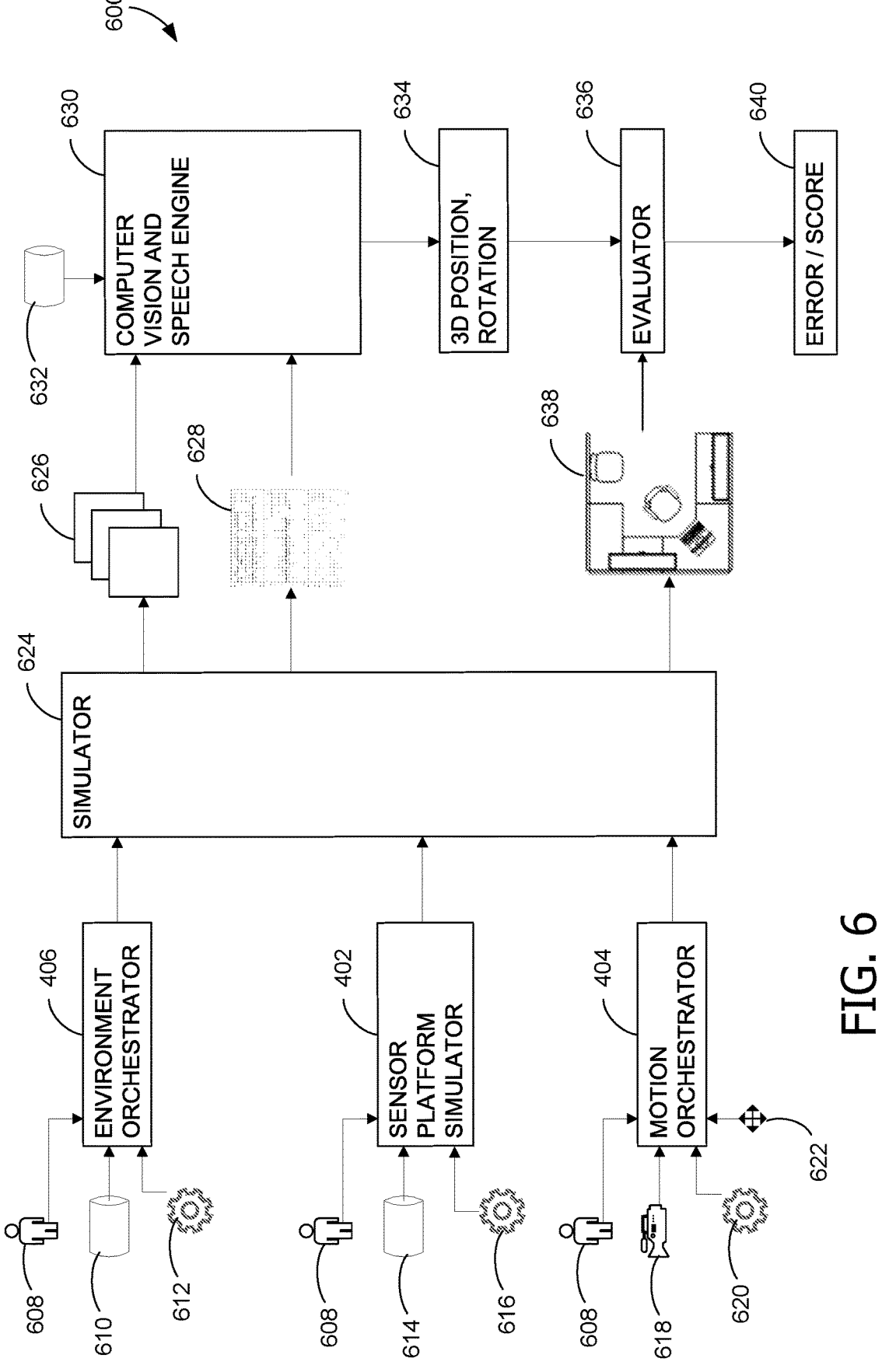
FIG. 6 is a block diagram of a computer vision and speech design service suitable for implementing some of the various examples disclosed herein.

FIG. 6 is another a block diagram of a networked environment 600 for a computer vision and speech design service suitable to provide computer vision and speech services for simulated hardware configurations in a synthetic scene. As shown, environmental orchestrator 406 may be operated by a user 608, read from a scripted set of pre-configured environment data 610, or programmatically-generated environment data 612, for instance created by an algorithm or script that assists in automating test scenario generation. Various lighting conditions may be simulated that can affect image collection, and a single scene or multiple scenes can be used. Sensor platform simulator 402 may be operated similarly, with a user 608, read from a scripted set of pre-configured simulation data 612, or programmatically-generated simulation data 616. Sensor platform simulator 402 simulates sensor data, including images, IMU readings, wireless signals and data (Wi-Fi, GPS), and depth measurements (from RGB-D, LIDAR and time-of-flight cameras).

Motion orchestrator 404 simulates the trajectory and orientation of the synthetic device under test (DUT). Environmental orchestrator 404 may be operated similarly, with a user 608, read from a scripted set of pre-configured simulation data 612, or programmatically-generated simulation data 616. The motion may be modeled or recorded from actual real-world devices, to provide typical movement scenarios for VR devices, including HMDs. Both IMU data and data from other 6DoF device sensors may be captured, perhaps by a user walking around a real-world scene, that is later modeled, and pointing the cameras or other sensors at various points of interest.

A simulator 624, perhaps similar to architecture 500 of FIG. 5 takes the input data and produces a set of images 626 that will be used by computer vision and speech algorithms to attempt to calculate the 3D coordinates of the synthetic DUT relative to the synthetic scene. Simulator 624 also outputs IMU data 628, illustrated as plots of accelerometer (linear displacement) data, gyroscope (rotational) data, and magnetometer data, all with 3D components. It should be understood that multiple sets of data, representing multiple positions, orientations, and velocities of one or more synthetic DUTs passing through a synthetic scene may be generated by some embodiments.

In some embodiments, a 3D computer vision and speech engine 630 intakes a particular computer vision and speech algorithm for algorithm database 632 and calculates 3D coordinates of the synthetic DUT. In some embodiments, the output of 3D computer vision and speech engine 630 is one or more 3D position and rotation data sets 634. 3D computer vision and speech engine 630 may use a single computer vision and speech algorithm or multiple different algorithms. The illustrated environment 600 thus has the ability to conduct tests with multiple scenarios: (1) a single hardware configuration or multiple hardware configurations, each with (2) a single scene or multiple scenes: each with (3) a single motion profile or multiple motion profiles: each with (4) a single computer vision and speech algorithm or multiple different computer vision and speech algorithms. Thus, there are at least 16 different classes of experiments with this configuration, identified by whether a particular variable is held constant or varied.

Once the computer vision and speech data set (3D position and rotation data set 634) is calculated, the computer vision and speech data sets are evaluated by an evaluator 636 for accuracy and precision. Evaluator 636 may be used for comparing the calculated computer vision and speech data with ground truth data. Thus, the calculated values must be compared against the correct values. Because environment orchestrator 406 and motion orchestrator 404 produce the output for simulator 624 to use, the information about where the synthetic DUT is within the synthetic environment is available for use in the evaluation process. This known data, actual position of DUT and objects) is collectively known as the ground truth (GT) 638. The 3D position and rotation data set 634 is compared with GT 638 to output an error profile or score 640, which may be used by researchers or hardware designers to select a computer vision and speech solution (hardware configuration and algorithm).

Figure 7:
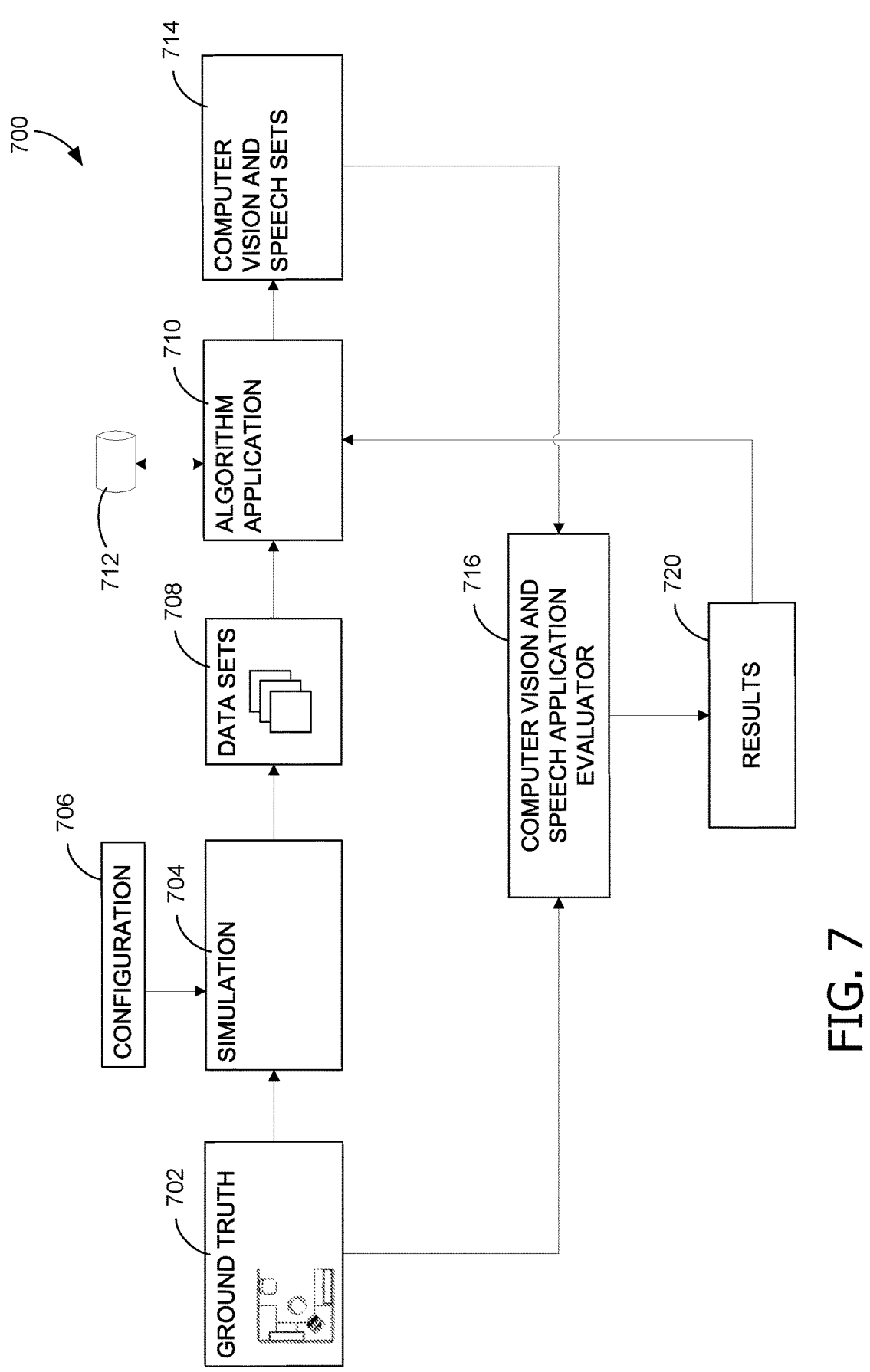
FIG. 7 is a block diagram of a work flow for a computer vision and speech design service suitable for implementing some of the various examples disclosed herein.

FIG. 7 is a block diagram of a process flow 700 for a computer vision and speech design service suitable for implementing some of the various examples disclosed herein. Process flow 700 provides an alternate visualization of both block diagram 600 (of FIG. 7) and flow chart 800 (of FIG. 8). GT data 702 is fed into a simulation 704, which takes as input specific configuration data 706, including scene configuration, hardware configuration, and hardware location/motion. Simulation 704 outputs data sets 708, including synthetic imagery and simulated IMU readings, to an algorithm application 710. Algorithm application 710 tests various computer vision and speech algorithms from a library 712 of computer vision and speech algorithms that take the image and IMU data to calculate the virtual position of the synthetic hardware device. The calculations are computer vision and speech result sets 714 that are then compared by a computer vision and speech application evaluator 716 with GT data 702, to produce evaluation results 720. Evaluation results 720 may be used by hardware designers to select a particular hardware configuration and computer vision and speech algorithm.

Alternatively or additionally, evaluation results 720 may be supplied, or fed back, to the algorithm application 710 for improving the computer vision and speech algorithms in the library 712. As previously mentioned, computer vision and speech algorithms identified as being the closest or within a range of closeness (e.g., within X percent, Y virtual distance, or a combination thereof) to the GT data 702 for the virtual hardware configuration may be identified as more accurately computing computer vision and speech parameters and stored accordingly. Other computer vision and speech algorithms may be determined to be less accurate and/or needing additional configuring (e.g., needing more programming or analyzing more images, synthetic scenes, motion, and/or hardware configurations). For these lesser-accurate computer vision and speech applications, disparity data of the simulated virtual hardware configuration compared with its GT data 702 may be fed back to the algorithm application 710 to improve the performance of such computer vision and speech applications. In some embodiments, the algorithm application 710 uses AI processing or machine-learning to improve the computer vision and speech applications in the library 712 based on—or triggered by—the evaluation results 720. For example, computer vision and speech applications that did not produce evaluation results 720 within a specific variance threshold (e.g., proximity to a ground truth) may be marked for additional testing or simulations or identified as faulty.

Testing and comparing results of the various computer vision and speech algorithms using the GT data 702 the data sets 704 enables the disclosed embodiments to intelligently and more efficiently improve computer vision and speech algorithms that traditionally needed to be evaluated one at a time. This ultimately leads to a more efficient way to design and test sets of computer vision and speech algorithms because the disclosed embodiment provide a feedback mechanism where simulated data for hardware configurations in synthetic environments may be used to identify the best performing computer vision and speech algorithms while improving others.

Figure 8:
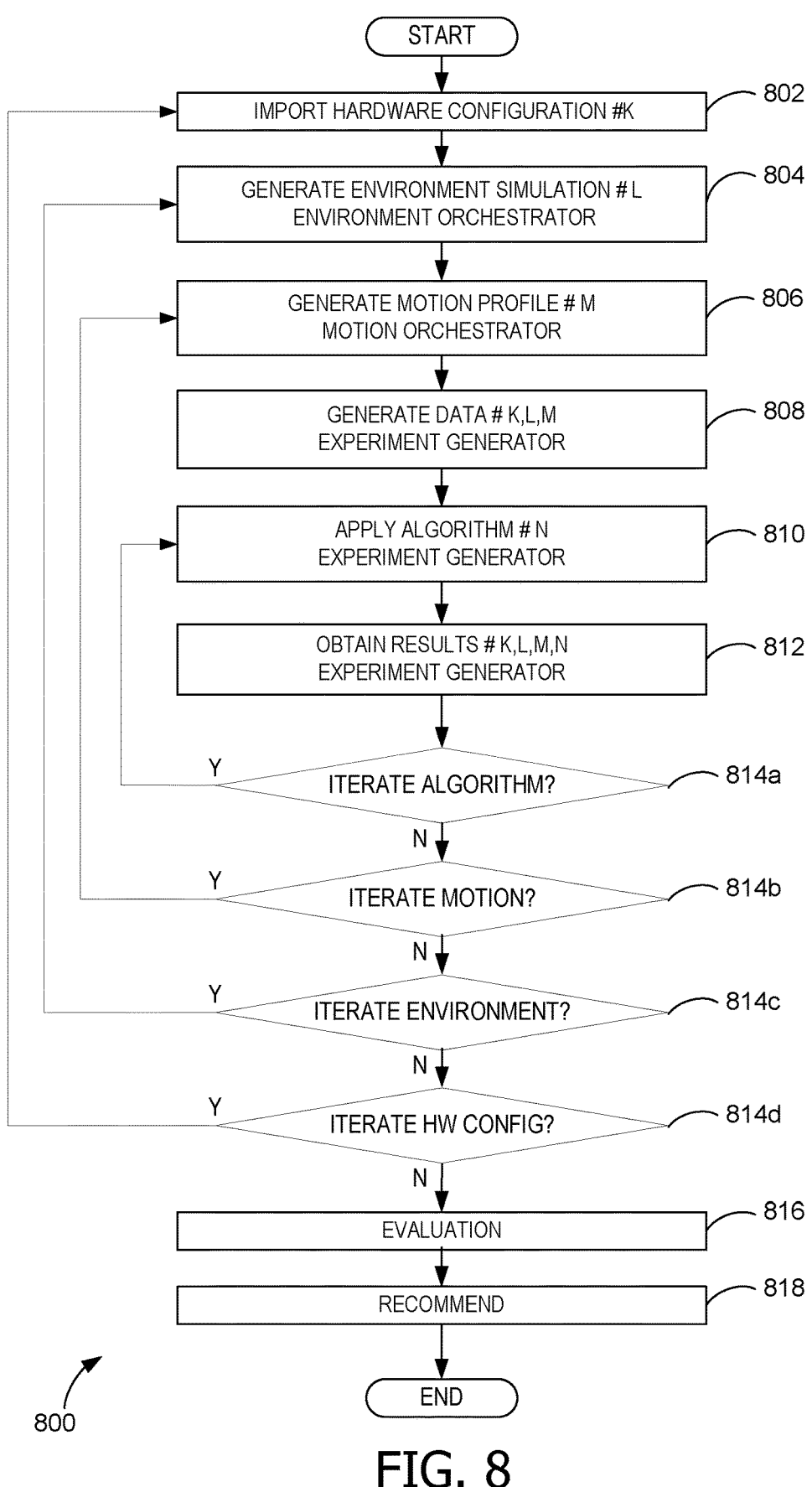
FIG. 8 is a flow chart illustrating an exemplary operation of a computer vision and speech design service suitable for implementing some of the various examples disclosed herein.

FIG. 8 is a flow chart 800 illustrating an example work flow of a computer vision and speech design service suitable for implementing some of the various examples disclosed herein. Flow chart 800 starts with step 802 importing one or more device configuration specifications and creating digital models. As indicated, some number, K, of different device specifications may be imported. In some embodiments, step 802 may use sensor platform simulator 402 of FIGS. 4 and 6. Step 804 generates the environment, consisting of GT data, such as one or more scenes to be used in the simulations, along with extended operating conditions (EOCs), which are variations of a scene, including variations such as lighting and object positions. Some number, L, of different scenes and EOCs may be created for use with the simulation experiments. Generating synthetic experiment data comprises simulating, for one or more hardware configurations sensor data that can be supplied to a computer vision and speech algorithm. In some embodiments, step 804 may use environment orchestrator 406 of FIGS. 4 and 6.

In step 806, some number, M, of different device positions and orientations are generated. The number M may be large. In some embodiments, step 806 may use motion orchestrator 404 of FIGS. 4 and 6. It should be understood that the processes may be implemented in various optional orders, for example motion orchestration and environment orchestration may be performed separately, as different processes, or together as a combined process.

Experimental data is generated for each combination of K, L, and M, for which an experiment is to be run, in step 808. The experiment generator (See 408 of FIG. 4) generates a plurality of candidate computer vision and speech solutions having differing hardware configurations to be tested or computer vision and speech algorithm parameters to be tuned. In step 810 a computer vision and speech algorithm, one of some number N, out of a set of algorithms is applied to the generated synthetic data, to obtain results 812 for the combination of device specification K, scene and EOC L, motion vector M, and algorithm N. In some embodiments, steps 808-812 may use experiment generator 408 of FIG. 4.

In steps 814a-814d, various ones of steps 802-812 are iterated to generate the desired set of synthetic experiment data for one or more combinations of hardware configurations, virtual environment, motion and computer vision and speech algorithms. Step 814a iterates on various different candidate computer vision and speech algorithms: step 814b iterates on various different motion profiles: step 814c iterates on various different environments and EOCs: and step 814d iterates on various different candidate hardware configurations. As illustrated, there are 16 different possible iteration scenarios (2^4) for generating the synthetic experiment data. Although the iteration controls steps 814a-814d are illustrated in a given order, it should be understood that the illustration is merely exemplary of a possible embodiment, and the iteration may occur in any order or combination.

In some embodiments steps 814*a*-814*d* may use experiment runner 410 of FIG. 4. Experimental data is evaluated in step 816, for example by comparing computer vision and speech algorithm output data with GT data, and a recommendation step 818 may provide a recommended best performing configuration or data from which a designer may select an adequately performing configuration. In this manner hardware configurations may be selected from a set of candidate hardware configurations, computer vision and speech algorithms may be selected from a set of candidate algorithms, or computer vision and speech algorithm parameters may be fine-tuned for optimal performance.

Additional Examples

Some examples are directed to a system of one or more servers configured for developing a computer vision or speech solution, the one or more servers comprising: a sensor platform simulator for simulating one or more hardware configurations comprising one or more virtual cameras: an environment orchestrator for simulating one or more virtual environments: a motion orchestrator for simulating motion of the one or more simulated hardware configurations within the one or more virtual environments: an experiment generator for generating synthetic experiment data for the one or more simulated hardware configurations having the simulated motion within the one or more virtual environments; and an experiment runner for iterating the experiment generator to generate the synthetic experiment data for one or more combinations of hardware configurations, virtual environment, motion and computer vision or speech algorithms. Additionally, these examples include any combination of the following:

the experiment generator being configured to generate a plurality of candidate computer vision or speech solutions having differing hardware configurations or computer vision or speech algorithm parameters;

an evaluator for comparing computer vision or speech algorithm output data with ground truth data;

the synthetic experiment data comprising synthetic images;

the synthetic experiment data comprising IMU data;

the IMU data comprising accelerometer data; and the IMU data comprising gyroscope data.

Other examples are directed to developing a computer vision or speech solution, the method comprising: importing, into a simulation, one or more hardware configurations for a sensor platform comprising one or more virtual sensors: generating an environment simulation for one or more virtual environments: generating a motion profile simulating motion of the one or more hardware configurations within the one or more virtual environments: generating synthetic experiment data for the one or more hardware configurations having the simulated motion within the one or more virtual environments; and iterating the generation of synthetic experiment data for one or more combinations of hardware configurations, virtual environment, motion and computer vision or speech algorithms. Additionally, these examples may include features for generating synthetic experiment data comprising simulating, for the one or more hardware configurations, sensor data that can be supplied to a computer vision or speech algorithm and evaluating the computer vision or speech solution by comparing a computer vision or speech algorithm output data with ground truth data.

Still other examples are directed to one or more computer storage devices having computer-executable instructions stored thereon for developing a computer vision or speech solution, which, on execution by a computer, cause the computer to perform operations, the instructions comprising: a sensor platform simulator component for simulating one or more hardware configurations comprising the one or more virtual sensors: an environment orchestrator component for simulating one or more virtual environments; a motion orchestrator component for simulating motion of the one or more simulated hardware configurations within the one or more virtual environments: an experiment generator component for generating synthetic experiment data for a plurality of candidate computer vision or speech solutions having differing hardware configurations or computer vision or speech algorithm parameters: and an experiment runner component for iterating the experiment generator to generate the synthetic experiment data for one or more combinations of hardware configurations, virtual environment, motion and computer vision or speech algorithms. Additionally, these examples may include an evaluator component for comparing computer vision or speech algorithm output data with ground truth data.

While the aspects of the disclosure have been described in terms of various examples with their associated operations, a person skilled in the art would appreciate that a combination of operations from any number of different examples is also within scope of the aspects of the disclosure.

Example Operating Environment

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The examples illustrated and described herein, as well as examples not specifically described herein but within the scope of aspects of the disclosure, constitute exemplary means for providing an end-to-end computer vision and speech design service in a cloud computing environment. For example, the elements described in FIGS. 4-7, such as when encoded to perform the operations illustrated in FIG. 8, constitute exemplary means for providing an end-to-end computer vision and speech design service, one that saves developers a considerable amount of time and processing resources by simulated virtual configurations of real hardware in a synthetic environment to determine whether computer vision and speech parameters may be accurately generated.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:

performing a simulation using ground truth data and configuration data, the configuration data including scene configuration data, hardware configuration data, and hardware location data;

based on the performed simulation, outputting a synthetic video scene and simulated inertial measurement unit (IMU) data;

testing a plurality of computer vision and speech algorithms using the synthetic video scene and the simulated IMU data, the testing comprising:

calculating a virtual position and speech data of a synthetic hardware device;

comparing the calculated virtual position and the speech data with the ground truth data; and producing evaluation results based on the comparison; and marking one or more of the plurality of computer vision and speech algorithms that did not produce the evaluation results within a variance threshold, the marking comprising marking the one or more of the plurality of computer vision and speech algorithms for one or more of:

additional testing, simulations, and as faulty.

2. The method of claim 1, further comprising:

marking computer vision and speech algorithms other than the one or more of the plurality of computer vision and speech algorithms as accurately computing computer vision parameters and speech parameters.

3. The method of claim 1, further comprising:

feeding back disparity data of the one or more of the plurality of computer vision and speech algorithms; and improving performance of the one or more of the plurality of computer vision and speech algorithms based on the disparity data.

4. The method of claim 1, wherein the configuration data is associated with the synthetic hardware device.

5. The method of claim 1, wherein the simulated IMU data comprises one or more of accelerometer data, gyroscope data, and magnetometer data.

6. The method of claim 1, wherein the hardware configuration data is associated with a first hardware configuration and a second hardware configuration, wherein the first hardware configuration is a first camera and the second hardware configuration is a second camera different from the first camera.

7. The method of claim 1, wherein the hardware configuration data is associated with a first hardware configuration and a second hardware configuration, wherein the first hardware configuration is a first mobile phone and the second hardware configuration is a second mobile phone different from the first mobile phone.

8. A system comprising:

a memory embodied with executable instructions; and a processor programmed for:

performing a simulation using ground truth data and configuration data, the configuration data including scene configuration data, hardware configuration data, and hardware location data;

based on the performed simulation, outputting a synthetic video scene and simulated inertial measurement unit (IMU) data;

testing a plurality of computer vision and speech algorithms using the synthetic video scene and the simulated IMU data, the testing comprising:

calculating a virtual position and speech data of a synthetic hardware device;

comparing the calculated virtual position and the speech data with the ground truth data; and producing evaluation results based on the comparison; and marking one or more of the plurality of computer vision and speech algorithms that did not produce the evaluation results within a variance threshold, the marking comprising marking the one or more of the plurality of computer vision and speech algorithms for one or more of: additional testing, simulations, and as faulty.

9. The system of claim 8, wherein the processor is further programmed for:

marking computer vision and speech algorithms other than the one or more of the plurality of computer vision and speech algorithms as accurately computing computer vision parameters and speech parameters.

10. The system of claim 8, wherein the processor is further programmed for:

feeding back disparity data of the one or more of the plurality of computer vision and speech algorithms; and improving performance of the one or more of the plurality of computer vision and speech algorithms based on the disparity data.

11. The system of claim 8, wherein the configuration data is associated with the synthetic hardware device.

12. The system of claim 8, wherein the simulated IMU data comprises one or more of accelerometer data, gyroscope data, and magnetometer data.

13. The system of claim 8, wherein the hardware configuration data is associated with a first hardware configuration and a second hardware configuration, wherein the first hardware configuration is a first camera and the second hardware configuration is a second camera different from the first camera.

14. The system of claim 8, wherein the hardware configuration data is associated with a first hardware configuration and a second hardware configuration, wherein the first hardware configuration is a first mobile phone and the second hardware configuration is a second mobile phone different from the first mobile phone.

15. A computer storage medium storing computer-executable instructions which on execution by a computer cause the computer to perform operations comprising:

performing a simulation using ground truth data and configuration data, the configuration data including scene configuration data, hardware configuration data, and hardware location data, the hardware configuration data including data associated with a microphone sensor and an inertial measurement unit (IMU) sensor;

based on the performed simulation, outputting a synthetic video scene and simulated IMU data;

testing a plurality of computer vision and speech algorithms using the synthetic video scene and the simulated IMU data, the testing comprising:

calculating a virtual position and speech data of a synthetic hardware device;

comparing the calculated virtual position and the speech data with the ground truth data; and producing evaluation results based on the comparison; and marking one or more of the plurality of computer vision and speech algorithms that did not produce the evaluation results within a variance threshold, the marking comprising marking the one or more of the plurality of computer vision and speech algorithms for one or more of:

additional testing, simulations, and as faulty.

16. The computer storage medium of claim 15, wherein the operations further comprise:

marking computer vision and speech algorithms other than the one or more of the plurality of computer vision and speech algorithms as accurately computing computer vision parameters and speech parameters.

17. The computer storage medium of claim 15, wherein the operations further comprise:

feeding back disparity data of the one or more of the plurality of computer vision and speech algorithms; and improving performance of the one or more of the plurality of computer vision and speech algorithms based on the disparity data.

18. The computer storage medium of claim 15, wherein the configuration data is associated with the synthetic hardware device.

19. The computer storage medium of claim 15, wherein the simulated IMU data comprises one or more of accelerometer data, gyroscope data, and magnetometer data.

20. The computer storage medium of claim 15, wherein the hardware configuration data is associated with a first hardware configuration and a second hardware configuration, wherein the first hardware configuration is a first mobile phone and the second hardware configuration is a second mobile phone different from the first mobile phone.

\* \* \* \* \*